United States Patent [19]
Eichholz et al.

[11] Patent Number: 5,588,636
[45] Date of Patent: Dec. 31, 1996

[54] WATER FIXTURE CONTROL SYSTEM

[75] Inventors: Heinz-Dieter Eichholz, Iserlohn; Hans-Peter Rudrich, Windischeschenbach, both of Germany

[73] Assignee: Friedrich Grohe Aktiengesellschaft, Hemer, Germany

[21] Appl. No.: 488,629

[22] Filed: Jun. 8, 1995

[30] Foreign Application Priority Data

Jun. 10, 1994 [DE] Germany .......................... 44 20 334.9

[51] Int. Cl.⁶ ................................. F16K 31/02
[52] U.S. Cl. .................. 251/129.04; 4/DIG. 3; 364/140; 364/187
[58] Field of Search ..................... 251/129.04; 4/DIG. 3; 364/184, 187, 509, 510, 140, 141, 146

[56] References Cited

U.S. PATENT DOCUMENTS

| | | | |
|---|---|---|---|
| 3,337,992 | 8/1967 | Tolson | 4/DIG. 3 |
| 3,551,919 | 1/1971 | Forbes | 251/129 |
| 3,778,023 | 12/1973 | Billeter | 251/30 |
| 4,283,773 | 8/1981 | Daughton et al. | 364/140 |
| 4,756,030 | 7/1988 | Juliver . | |
| 4,809,174 | 2/1989 | Momenthy | 364/509 |
| 4,838,310 | 6/1989 | Scott et al. | 251/129.04 |
| 4,858,172 | 8/1989 | Stern | 364/510 |
| 5,469,503 | 11/1995 | Butensky et al. | 364/187 |

FOREIGN PATENT DOCUMENTS

| | | |
|---|---|---|
| 0187484 | 7/1986 | European Pat. Off. . |
| 0332045 | 9/1989 | European Pat. Off. . |
| 3807484 | 3/1988 | Germany . |
| 3829831 | 3/1990 | Germany . |
| 3923566 | 12/1990 | Germany . |
| 4107860 | 9/1992 | Germany . |

Primary Examiner—John T. Kwon
Attorney, Agent, or Firm—Herbert Dubno

[57] ABSTRACT

A fixture provided with proximity sensing for operation of the valve and contactless setting of the parameters of the control circuit for operating the valve of the fixture, can have a nonvolatile memory which is effective independently of the power supply for the control circuit so that the set parameters are maintained in the memory even on battery failure and are available to restore operation with the set parameters when power is restored.

14 Claims, 1 Drawing Sheet

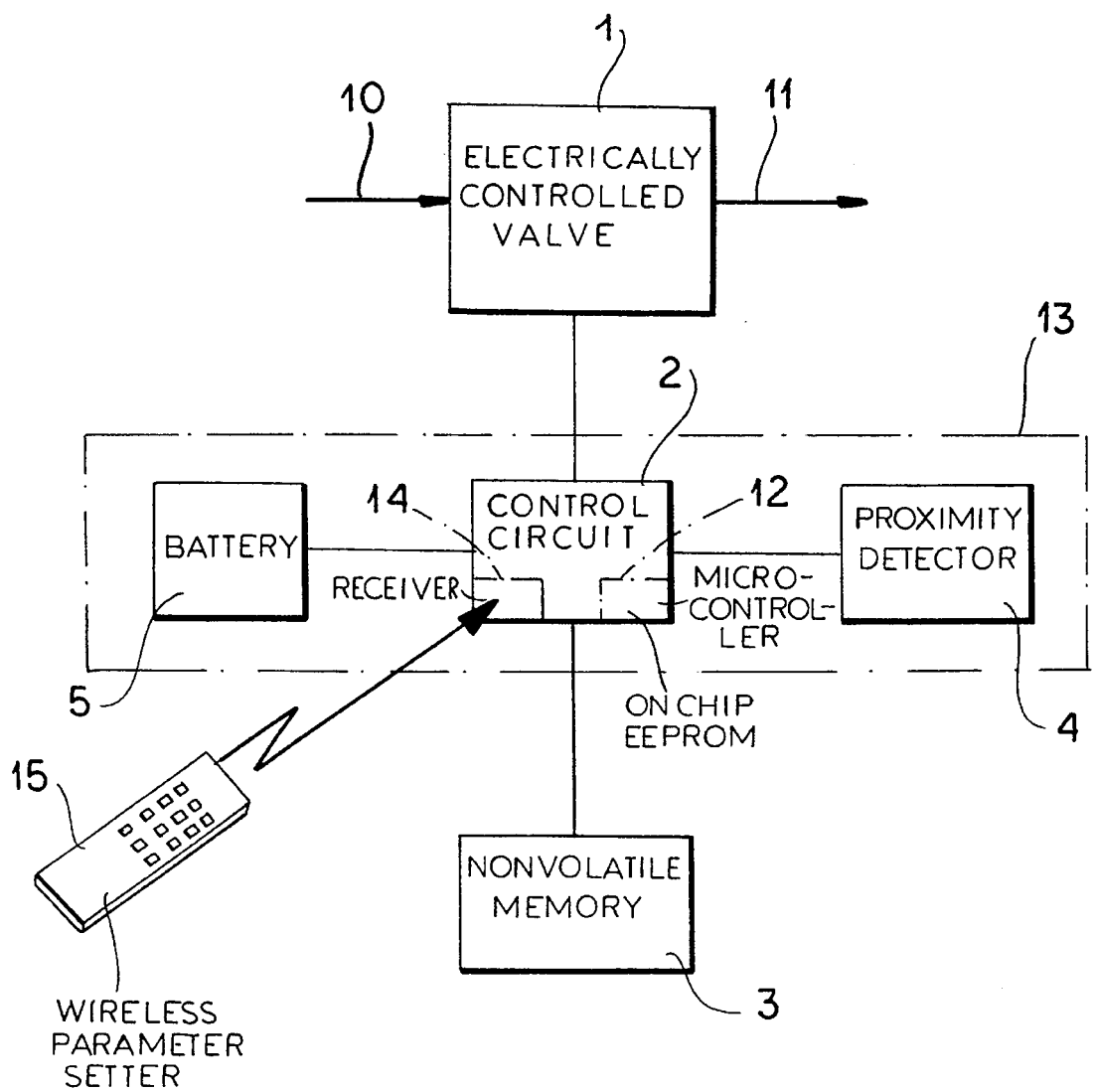

WATER FIXTURE CONTROL SYSTEM

FIELD OF THE INVENTION

The present invention relates to a proximity-type sanitary fixture control system which utilizes contactless setting of system parameters and/or operating parameters.

BACKGROUND OF THE INVENTION

It is already known from German Patent Document DE 3 807 484 C1 to provide contactless parameterization of sanitary fixtures which operate by proximity detection and, indeed, such devices are also on the market. The ability to set or change system parameters of sanitary fittings in a contactless manner has the advantage that certain operating functions or operating modes, for example, test and balancing modes, continuous operation, intermittent operation, thermal disinfection and the like can all be initiated without additional service elements within the valve housing and, in addition, internal control functions, for example, setting of the response range for the proximity detection tracking time, flushing duration, delay periods and the like can be modified without direct intervention with internal or external adjustments of the valve system.

Furthermore, a contactless communication with the valve system can allow remote interrogation of internal operating states, for example, battery charge level. Such sanitary fixtures therefore need not be opened for the setting or resetting of at least certain system parameters so that special tools need not be used nor must the valve assembly be left prone to vandalism.

The system parameters and mode of operation can be changed from one sanitary fixture to another with a high degree of user selectivity. For example, in/out and on/off functions for different sanitary fixtures, timer functions, proximity response ranges and the like may be set for the various infrared detectors of different fixtures independently from one another and without opening of the units or other direct access thereto.

The system hitherto employed for the contactless parameterization of sanitary fixtures, i.e. the setting of the system and operating parameters or function selection in a contactless manner resulted in a storage of the modified parameters during normal operation. However, upon a failure of the voltage source or upon removal of an internal energy source like a battery, the settings were lost. As a consequence, it was always necessary when the sanitary fixture was placed again in operation, i.e. a new battery installed, for the basic parameters to be reset or a standardized operation mode set for the particular unit. The need to reset the sanitary fixture upon a power failure or upon replacement of the voltage source was a significant problem, especially where a number of sanitary fixtures had to be reset by operating or maintenance personnel.

OBJECTS OF THE INVENTION

It is the principal object of the present invention, to provide an improved sanitary fixture, operating with contactless parameterization, i.e. setting of operating and system parameters and proximity detection, whereby drawbacks of the earlier apparatus for this purpose can be avoided.

A more specific object of the invention is to provide a water control setting for a sanitary fixture of the proximity-detection type in which parameter and apparatus functions of the device, once set, can remain effective even in the case of power supply failure (e.g. a defect in a power supply network, battery replacement or the like) so that upon restoration of the voltage source, operation of the fixture with the original parameters can occur without the need for individual resetting of the fixture.

SUMMARY OF THE INVENTION

These objects and others which will become apparent hereinafter are attained, in accordance with the invention by providing a nonvolatile memory for the system parameters and/or the operating parameters of the controlled circuit in the form of one or more storage or memory units which are independent of the voltage source for the control circuit.

More particularly, a water control device or sanitary device or sanitary setting according to the invention can comprise:

an electrically controllable valve for dispensing water in a sanitary fixture;

a control circuit operatively connected to the valve and provided with a proximity detector for operating the valve in response to proximity of a user of the fixture and with system parameters and operating parameters including flow duration and operating range of the proximity detector;

a voltage source connected to the control circuit;

means in wireless communication with the control circuit for contactless setting of at least one of the system and operating parameters in the control circuit; and at least one nonvolatile memory connected to the control circuit for storing the system and operating parameters independently of failure of the voltage source whereby operation of the control circuit with the system and operating parameters is automatically restored by the nonvolatile memory upon restoration of the voltage source to the control circuit.

According to a feature of the invention, the nonvolatile storage is effected in an analog and/or digital manner. The nonvolatile memory can be a long term storage or a nonvolatile short term storage or a combination of nonvolatile short term storage and long term storage.

It has been found to be especially advantageous to provide an E²PROM (EEPROM or electronically erasable EPROM) as the nonvolatile digital storage.

The digital long term storage can also be a flash-EPROM and/or a condenser-buffered static ram and/or a battery buffered static ram and/or a digital access storage or DAS-chip and/or a digital potentiometer.

Furthermore, the control circuit may include a microcontroller, i.e. a microprocessor, with an integrated on-chip E²PROM. The advantage of the invention, of course, is that it allows operation of the valve or faucet of the fixture with contactless parameterization, i.e. the setting of the operational and system parameters, and even after or upon interruption of the supply voltage for the control circuit, does not need a new adjustment or setting of the system parameters for restoring the operation to exactly the state before the interruption. The preprogrammed functioning and system characteristics of the device thus are restored automatically and there is no need for setting or balancing via potentiometers, resetting of controllers, operation of function selector switches or the like within the control circuit.

For example, an a proximity operating urinal system, can have contactless control so that the customary setting device or the manual setting itself can be eliminated and the timing for the flushing duration can be effected via a timer whose operation is controlled in response to the nonvolatile memory. During the system initialization (power on), the setting for the flushing duration is read from the nonvolatile memory and used to set the timer, for example, a register controlled by the microprocessor or MCU. The same applies for other setting and balancing operations and parameter, for example, the range of effectiveness sensor (proximity range at which the fixture triggers), operating mode, setting of functions selector switches and other analog and/or digital setting and balancing operations.

The nonvolatile storage of system parameters allows a simple automatic adjustment or the automatic function setting of the control circuit since a change in the system parameter does not require a mechanical adjustment of a setting or balancing unit like a potentiometer, trimmer resistors or DIP switches, but utilizes information directly or indirectly stored in the nonvolatile storage of the system. Since no mechanical setting need be provided with the system of the present invention, system balancing or setting can be effected after potting of the controlled electronics or otherwise encapsulating of same to provide protection against moisture and against mechanical stresses or upon the sealing of the housing. The hitherto required expensive housing affording access to the control electronics with corresponding seals and the danger of ambient environment effects of the settings, can be completely eliminated.

A control of sanitary settings utilizing nonvolatile memory is especially advantageous in combination with a system for the contactless change in system parameters because in that case there is normally a hermetic encapsulation in the controlled electronic by a potting or injection of plastic around the control electronics. The system of the invention simplifies fabrication, insures high reliability of the circuitry because of the improved protection against moisture and provides a high degree of mechanical stability of the system and thus long life and operational reliability.

The invention also has important advantages in combination with the contactless parameterization of the sanitary fixture.

In particular, it allows changes in the systems conditions without direct operations on the mechanics of the control electronics and retention of the parameters which have been set even in the case of failure of the voltage supply for the control circuit.

The invention also simplifies the housing for the control electronics since adjustment and balancing operations no longer require any mechanical action on components of the system electronics.

The system parameters can be controlled at various levels depending upon the user requirements, independently of one another.

Nonvolatile storage of system data (for example, operating hour count, valve actuating count, fabrication data) are all available for diagnosis and statistical evaluation.

The system allows customer-specific setting (e.g. by macros) for remote control or servicing without software variations and selection of control codes.

The nonvolatile storage system parameter and/or operating parameter of the control circuit for the electrically controlled valve or faucet can be effected in analog and/or digital ways.

The reference to long-term storage is intended to refer to the ability to retain information for periods up to 40 years even in the case of voltage supply failures. Short term storage generally refers to the ability to retain information for a limited period of time ranging from minutes to days.

BRIEF DESCRIPTION OF THE DRAWING

The above and other objects, features, and advantages will become more readily apparent from the following description, reference being made to the accompanying drawing in which the sole FIGURE is a block diagram illustrating the principles of the invention.

SPECIFIC DESCRIPTION

The drawing shows schematically a sanitary fixture such as a toilet, urinal or wash basin provided at 1 with an electrically controlled valve or faucet as is customary with such fixtures, having a water inlet 10 and a water outlet 11.

The valve may be or can include a magnetic valve which is operated by an electronic circuit 2. A proximity detector 4, e.g. an infrared radiation ranging sensor, can be provided in the region of the outlet 11 to detect the approach of a user. The proximity detector 4 is connected to the control circuit 2 as described, for example, in German Patent Document 38 07 484 and is common with proximity detector control of sanitary fixtures.

Customarily, upon detection of the presence of a user at a certain range, preset in the control circuit 2, the control circuit 2 responds via a microcontroller or microprocessor 12 to initiate a water delivery program, i.e. the supply of water at a certain time after proximity detection or immediately, for a certain duration, etc. The magnetic valve in accordance with this program receives an opening pulse and, if it has a holding type of magnet or a bistable system, a closing pulse to shut off the flow of water. Electrical supply is provided by a battery 4 and a common housing 13 containing the valve 1 can be provided for the battery, control circuit and proximity detector. An infrared receiver 14 or some other wireless receiver capable of being operated by a wireless parameter setter 15 can be provided for the control circuit 2 to allow the parameters of the control circuit to be set or changed. These parameters can include the delay prior to opening of the valve, the opening duration and parameters of the type previously described. The contactless setting is here effected utilizing infrared signals although it is also possible to use radiowaves, noninfrared optical signals and even acoustic signals for the wireless communication.

For reliable operation even in the case of battery failure or replacement, the control circuit 2 is provided with a nonvolatile memory 3 of the type described in which the parameters set by the unit 15 are stored and independently from the supply from battery 5 so that, upon battery replacement, previously set values of the valve opening duration and the delay can be restored automatically upon replacement of the battery.

The nonvolatile memory is preferably an $E^2PROM$ although any of the other nonvolatile memories or combinations can be used as well.

We claim:

1. A water-control device comprising:

an electrically controllable valve for dispensing water in a sanitary fixture;

a control circuit operatively connected to said valve and provided with a proximity detector for operating said valve in response to proximity of a user of said fixture and with system parameters and operating parameters including flow duration and operating range of said proximity detector;

a voltage source connected to said control circuit;

means in wireless communication with said control circuit for contactless setting of at least one of said system and operating parameters in said control circuit; and at least one nonvolatile memory connected to said control circuit for storing said system and operating parameters independently of failure of said voltage source whereby operation of said control circuit with said system and operating parameters is automatically restored by said nonvolatile memory upon restoration of said voltage source to said control circuit.

2. The water-control device defined in claim 1 wherein said nonvolatile memory is a digital storage memory.

3. The water-control device defined in claim 1 wherein said nonvolatile memory is a analog storage memory.

4. The water-control device defined in claim 1 wherein data is stored in said nonvolatile memory in a digital and analog manner.

5. The water-control device defined in claim 1 wherein said nonvolatile memory is a long-term nonvolatile storage.

6. The water-control device defined in claim 1 wherein said nonvolatile memory is a short-term nonvolatile storage.

7. The water-control device defined in claim 1 wherein said nonvolatile memory is a combination of short-term nonvolatile storage and long-term nonvolatile storage.

8. The water-control device defined in claim 1 wherein said nonvolatile memory includes a $E^2PROM$ nonvolatile fixed-value storage.

9. The water-control device defined in claim 1 wherein said nonvolatile memory includes a flash-EPROM digital long-term storage.

10. The water-control device defined in claim 1 wherein said nonvolatile memory includes a condenser-buffered static RAM digital long-term storage.

11. The water-control device defined in claim 1 wherein said nonvolatile memory includes a battery-buffered static RAM digital long-term storage.

12. The water-control device defined in claim 1 wherein said nonvolatile memory includes a DAS chip long-term storage.

13. The water-control device defined in claim 1 wherein said nonvolatile memory includes a digital potentiometer long-term storage.

14. The water-control device defined in claim 1 wherein said control circuit includes an integrated microcontroller with an on-chip $E^2PROM$.

* * * * *